United States Patent
Henderson et al.

(10) Patent No.: US 7,380,435 B1
(45) Date of Patent: Jun. 3, 2008

(54) LAB ANIMAL TRACKER AND DETERMINISTIC SHOCKER

(75) Inventors: Ross P. Henderson, Tallahassee, FL (US); Carlos A. Bolanos, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 90 days.

(21) Appl. No.: 11/594,701

(22) Filed: Nov. 7, 2006

Related U.S. Application Data

(60) Provisional application No. 60/734,343, filed on Nov. 7, 2005.

(51) Int. Cl.
*G01M 7/00* (2006.01)
*A01K 37/00* (2006.01)

(52) U.S. Cl. .................. 73/12.01; 119/712; 119/720; 119/721; 43/98

(58) Field of Classification Search ............... 73/12.01; 119/712, 720, 721; 43/98
See application file for complete search history.

(56) References Cited

U.S. PATENT DOCUMENTS

| | | | | |
|---|---|---|---|---|
| 5,269,091 A | * | 12/1993 | Johnson et al. ................ | 43/98 |
| 5,425,330 A | * | 6/1995 | Touchton et al. ........... | 119/721 |
| 5,435,271 A | * | 7/1995 | Touchton et al. ........... | 119/721 |
| 5,850,808 A | * | 12/1998 | Burdick ....................... | 119/713 |
| 6,006,698 A | * | 12/1999 | Negre .......................... | 119/537 |
| 6,283,064 B1 | * | 9/2001 | Djukastein et al. ......... | 119/713 |
| 6,933,446 B1 | * | 8/2005 | Waldorf et al. .......... | 174/117 F |
| 7,249,436 B2 | * | 7/2007 | Ravenelle et al. .............. | 43/98 |
| 2006/0232370 A1 | * | 10/2006 | Ravenelle et al. .......... | 336/200 |

* cited by examiner

*Primary Examiner*—Edward Lefkowitz
*Assistant Examiner*—Freddie Kirkland, III
(74) *Attorney, Agent, or Firm*—Peter Loffler

(57) ABSTRACT

A deterministic shocker holds a test animal within an enclosure on a grid floor of electrodes such that a controller places a small current across each electrode and measures the electrical resistance of each electrode. The electrode with the lowest resistance strongly correlates to the location of a paw of the animal so that the controller delivers a small electric shock to only that electrode. Animal movement can be tracked and recorded during an experimental run. A second enclosure may be located adjacent the first enclosure separated by a transparent partition wherein the second enclosure also has a grid floor comprised of a plurality of electrodes, The controller also places a current across each of these electrodes and measures the electrical resistance thereof so that this animal's movement can also be tracked during the experiment to measure this second animal's response in witnessing the shocking of the first animal.

16 Claims, 2 Drawing Sheets

LAB ANIMAL TRACKER AND DETERMINISTIC SHOCKER

This application claims the benefit of provisional patent application No. 60/734,343 filed on Nov. 7, 2005, which provisional application is incorporated herein by reference.

BACKGROUND OF THE INVENTION

1. Field of the Invention

The present invention relates to a device that tracks the movement of an animal within a research cage and delivers a well controlled and measured shock to the animal's feet. The device also allows the tracking of two animals that can see each other with one of the animals receiving the shocks.

2. Background of the Prior Art

It is often desirable to track the movement of an animal within a research cage while delivering a pain stimulus in order to measure the animal's response to the pain. For example, it may be desirable to track the movements of a mouse while receiving pain stimulus both before and after giving the mouse a newly developed pain medication in order to determine the efficacy of the drug. Of the various types of pain stimulus that can be delivered, a small electric shock of short duration finds favor with many researchers.

In order to deliver these shocks, devices have been proposed wherein a cage is provided, which cage has a grid floor wherein the individual rods forming the grid floor are each electrodes electrically connected to a shock generation device. The test animal stands on some of the rods of the grid floor and electric current is applied across one of the electrodes upon which the animal is standing and a shock is thereby delivered. The problem with the present systems is that they lack knowledge of the location of the test animal on the grid floor. Accordingly, such systems rely on sequentially placing a current onto each rod until a current is placed onto a rod with which the animal is making contact thereby closing an electric circuit and shocking the animal. As such, the delivery of shocks to the animal is dependent on where the animal is standing and is random and therefore not deterministic which contributes to variability of results. An animal will not avoid shock in the same manner in each experiment. However, the sequential placement of the shocks is ordered in some fashion thereby leading to the animal being shocked in differing ways from experiment to experiment. Another problem with such systems is the potential to cause an electric burn to the animal due to high intensity localized power dissipation. For example, a rat may have a high resistance contact with an electrode at its tail. As the shocker applies power to this electrode, a burn can result due to the high voltage and corresponding high power density at this point of contact. Just one watt of power can result in burning a lab animal. Although the goal of the researcher is to deliver a pain stimulus, the researcher does not want to cause injury to the animal.

Accordingly, there exists a need in the art for a device that is capable of delivering a shock to a test animal wherein shock delivery is deterministic in order to have high repeatability between experiment runs. Such as system must be able to determine whereat a test animal is standing so that a shock can be delivered to the animal's foot, yet avoid shocking other body parts of the animal in order to minimize the risk of injury to the animal. Such a system should be of relatively simple design and construction so that it is easy to use and maintain.

SUMMARY OF THE INVENTION

The lab animal tracker and deterministic shocker of the present invention addresses the aforementioned needs in the art by providing a device that determines upon which electrode an animal's paws are located and delivers an electric shock only to that electrode. This gives a researcher high consistency between experiment runs and minimizes the risk of injury to the animal from an improperly delivered electric current. The lab animal tracker and deterministic shocker is capable of recording the movements of an animal throughout the experiment so that a researcher can study the movements of the animal after conclusion of the experiment. The lab animal tracker and deterministic shocker has the capacity to hold a second animal separated from the first animal by a transparent enclosure and measure and record the movements of the second animal without shocking the second animal so that a researcher can also record and study the movements of the second animal in response to the second animal witnessing the shocking of the first animal during an experiment. The lab animal tracker and deterministic shocker is of relatively simple design and construction and is easy to setup, use, and maintain.

The lab animal tracker and deterministic shocker is comprised of a first enclosure that has at least a first exterior wall that is transparent. A plurality of first rods extends across the first enclosure proximate a first bottom thereof. A controller is electrically connected to each of the plurality of first rods such that the controller places an electric current of generally no more than about 1 microampere for no longer than about 20 milliseconds across each of the plurality of first rods and measures the electrical resistance of each of the plurality of first rods and compares the electrical resistance of each of the plurality of first rods such that the controller delivers an electric shock to the respective one of the plurality of first rods that has the lowest electrical resistance. The electric shock delivered by the controller is on the order of about 1 milliamp. The controller records which of the plurality of first rods has the lowest electrical resistance during successive measurement and shock cycles. A second enclosure is located adjacent the first enclosure and is separated from the first enclosure by a transparent separator. The second enclosure also has at least a second exterior wall that is transparent. A plurality of second rods extends across the second enclosure proximate a second bottom thereof. The controller is electrically connected to each of the plurality of second rods such that the controller places an electric current of generally no more than about 1 microampere for no longer than about 20 milliseconds across each of the plurality of second rods and measures the electrical resistance of each of the plurality of second rods and compares the electrical resistance of each of the plurality of second. The controller also records which of the plurality of second rods has the lowest electrical resistance during successive measurement cycles in order to track animal movement.

BRIEF DESCRIPTION OF THE DRAWINGS

Similar reference numerals refer to similar parts throughout the several views of the drawings.

DESCRIPTION OF THE PREFERRED EMBODIMENT

Figure 1:
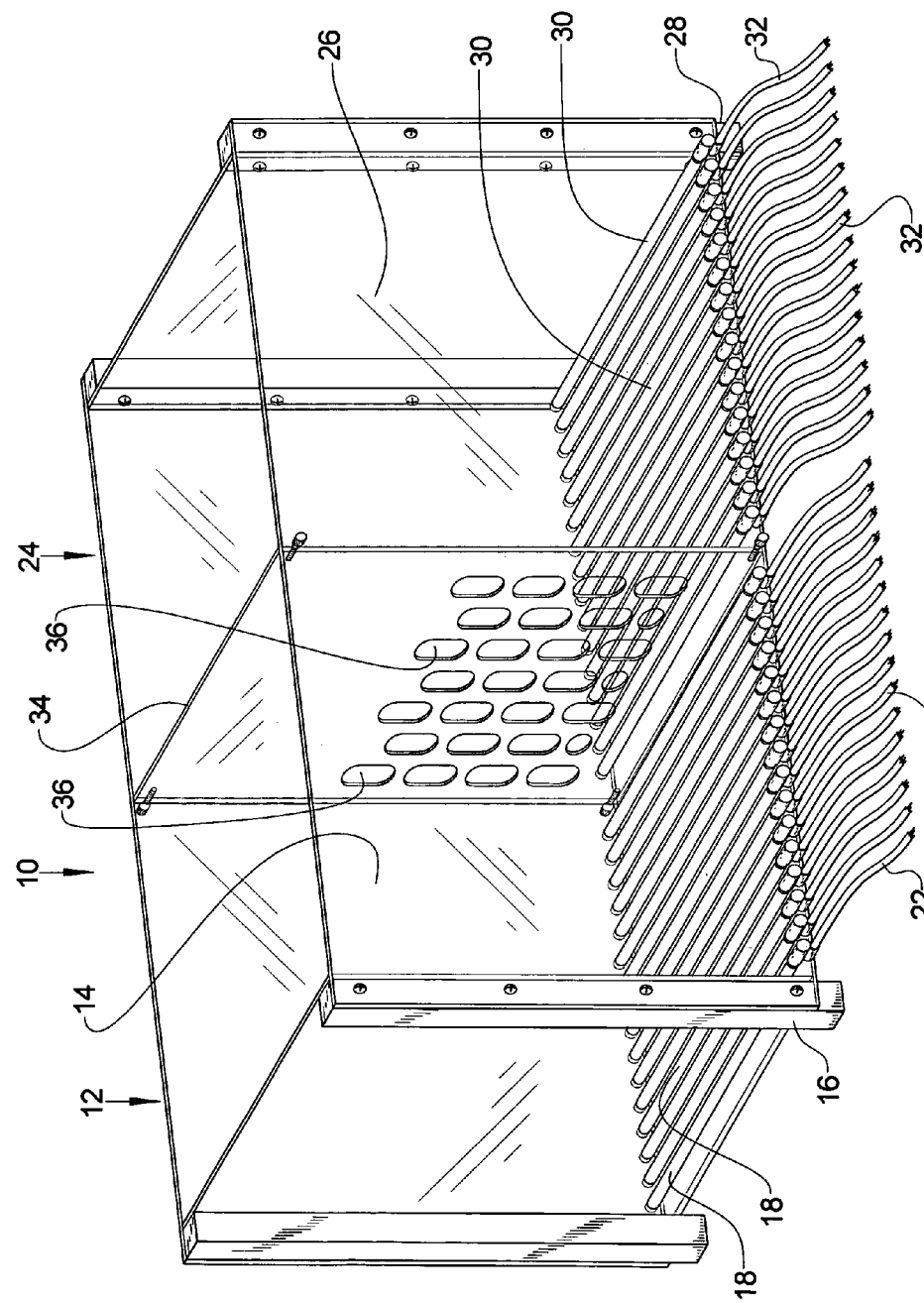
FIG. 1 is a perspective view of the cage enclosure of the lab animal tracker and deterministic shocker of the present invention.
Figure 2:
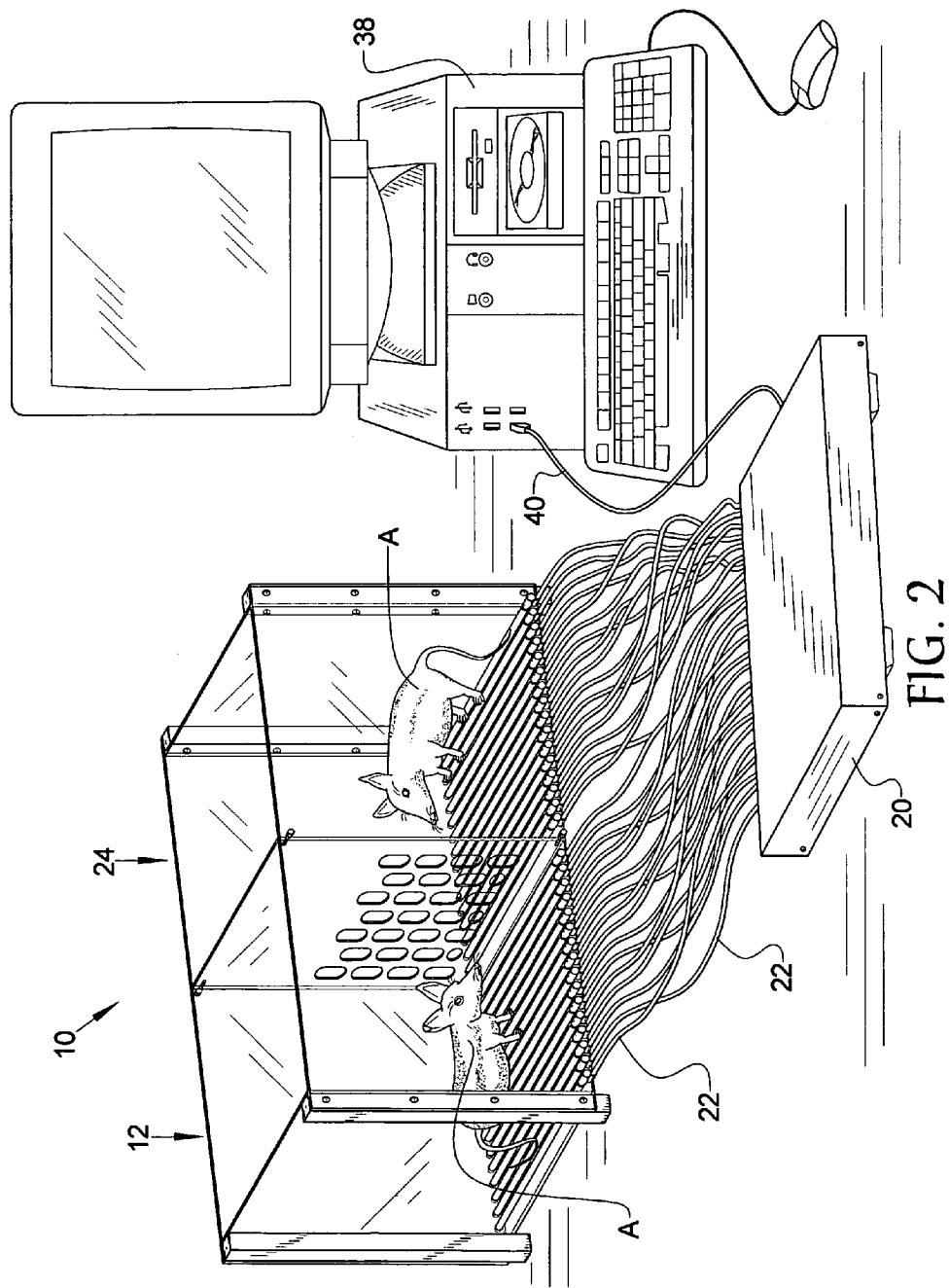
FIG. 2 a perspective view of the lab animal tracker and deterministic shocker including the control and recordation elements.

Referring now to the drawings, it is seen that the lab animal tracker and deterministic shocker of the present invention, generally denoted by reference numeral 10, is comprised of an enclosure 12 that has at least a front wall 14 that is transparent for easy viewing of the animal A located therein. Located proximate the base 16 of the enclosure 12 is a grid floor that is comprised of a series of generally parallel electrically conductive rods 18, each rod 18 serving as an electrode. The number of rods 18 can vary and is determined by the size of the enclosure 12, the size of the animal A within the enclosure, etc. A controller 20 is provided and each rod 18 is electrically connected with the controller 20 by an appropriate wire 22. The wires 22 may be individually strung as illustrated, or may be bundled together and have an appropriate interface (not illustrated) that connects with an appropriate corresponding interface (also not illustrated) on the controller 20. As seen, a second enclosure 24 may be provided, which second enclosure 24 may be similar to the first enclosure 12. At least the front wall 26 of this second enclosure 24 is also transparent for viewing an animal A therein. The second enclosure 24 also has a grid floor located proximate its base 28 the grid floor comprising a series of generally parallel electrically conductive rods 30 such that each rod 30 of this grid floor also serves an electrode and each rod 30 is also electrically connected to the controller 20 by an appropriate wire 32. The first enclosure 12 and the second enclosure 24 are separated by a transparent divider 34 that has a series of openings 36 to allow air and sound to easily pass between the two enclosures 12 and 24. Advantageously, although not necessarily, the two enclosures 12 and 24 are similar in size and configuration to one another.

The controller 20 has a series of functions. The controller 20 places a very low current (on the order of less than about 1 microampere) across each rod 18 and 30 for short duration of time (generally on the order of less than about 20 milliseconds) and measures the electrical resistance of each rod 18 and 30. If a given rod 18 or 30 has a very low resistance, then that rod 18 or 30 has the animal A making substantial contact with that rod 18 or 30 due to the fact that the animal A is completing the electrical circuit across the rod 18 or 30 resulting in the low resistance for the rod 18 or 30. If a given rod 18 or 30 has a relatively high resistance, then an electrical circuit is not completed across that rod 18 or 30 and thus the animal A is not making contact with that rod 18 or 30 or is making a minimal or high resistance contact with that rod 18 or 30 such that delivery of a shock to this high resistance contact could result in a micro-burn to the animal A. During a given scan, the controller 20 delivers an electric shock to only the rod 18 with the lowest measured resistance, signifying solid contact between rod 18 and animal A. Thereafter, the controller 20 scans the rods 18 again and delivers a shock to the rod 18 with the second lowest measured resistance which also signifies good animal A to rod 18 contact albeit probably a different paw of the animal A. The current of the shock (typically on the order of about 1 milliamp and possibly a pulsed square wave) and the interval between shocks as well as the duration of the between shock (typically on the order of one or at most a few seconds) are all controlled by the user. If the shock current across a rod 18 needs to be changed, it is changed by varying the voltage across the rod 18. By using the lab animal tracker and deterministic shocker 10, shocks can be delivered to the animal A in a deterministic manner and thereby allow high consistency between experiments. Additionally, as the controller 20 measures the resistance across each rod 18 and 30, the device 10 is capable to knowing where each animal A is located within a given enclosure 12 or 24. The rods 18 and 30 with the lowest resistance have an animal A thereon and this event can be determined and tracked by the controller 20. The controller 20 may be a standalone unit that is either programmable by appropriate programming input switches or may be manually set by appropriate controls during an experiment and that records the events including shock delivery and animal tracking, or as illustrated, the controller 20 can interface with an appropriate computer system 38 via an appropriate interface (the illustrated USB connection 40, a parallel or serial bus connection (not illustrated) a wireless connection, etc.). The computer 38 can perform the programming of the controller 20 and record the output results from the controller 20.

If a dual enclosure 12 and 24 lab animal tracker and deterministic shocker 10 is utilized, then one of the enclosures 12 has rods 18 that measure resistance and deliver shocks, while the other enclosure 24 may have rod 30 that only measure resistance across the rods 30. In this way, an animal A may be placed into each enclosure 12 and 24 with only the animal A in the first enclosure 12 receiving shocks. In this way, the movement of the animal A in the second enclosure 24 can be tracked in response to this animal's observations of the animal in the first enclosure 12 receiving shocks—does the animal A get stressed?

If desired, the wires 22 connecting the rods 18 in the first enclosure 12 with the controller 20 may be of a different color relative to the wires 32 connecting the rods 30 in the second enclosure 24 with the controller 20 (for example the first wires 22 may be red for hot and the second wires 32 may be black for neutral) in order to give the user a fast reminder of which enclosure 12 or 24 receives shocks and which one does not. Such a dual enclosure 12 and 24 system can be utilized with other pain stimulus systems including hot and cold delivery systems.

While the invention has been particularly shown and described with reference to an embodiment thereof, it will be appreciated by those skilled in the art that various changes in form and detail may be made without departing from the spirit and scope of the invention.

We claim:

1. A shocker comprising:
    a first enclosure;
    a plurality of first rods extending across the first enclosure proximate a first bottom thereof; and
    a controller electrically connected to each of the plurality of first rods such that the controller places an electric current across each of the plurality of first rods and measures the electrical resistance of each of the plurality of first rods and compares the electrical resistance of each of the plurality of first rods and such that the controller delivers an electric shock to the respective one of the plurality of first rods that has the lowest electrical resistance.

2. The shocker as in claim 1 wherein the electric current placed by the controller onto each of the plurality of first rods is no more than about 1 microampere and is no longer than about 20 milliseconds in duration.

3. The shocker as in claim 2 wherein the electric shock is about 1 milliamp.

4. The shocker as in claim 1 wherein an exterior wall of the first enclosure is transparent.

5. The shocker as in claim 1 wherein the controller records which of the plurality of first rods has the lowest electrical resistance.

6. The shocker as in claim 1 further comprising:
a second enclosure adjoining the first enclosure and separated from the first enclosure by a transparent separator;
a plurality of second rods extending across the second enclosure proximate a second bottom thereof; and
wherein the controller is electrically connected to each of the plurality of second rods such that the controller places an electric current across each of the plurality of second rods and measures the electrical resistance of each of the plurality of second rods and compares the electrical resistance of each of the plurality of second.

7. The shocker as in claim 6 wherein the electric current paced by the controller onto each of the plurality of first rods is no more than about 1 microampere and is no longer than about 20 milliseconds in duration and the electric current placed by the controller onto each of the plurality of second rods is no more than about 1 microampere and is no longer than about 20 milliseconds in duration.

8. The shocker as in claim 7 wherein the electric shock is about 1 milliamp.

9. The shocker as in claim 6 wherein a first exterior wall of the first enclosure is transparent and a second exterior wall of the second enclosure is transparent.

10. The shocker as in claim 6 wherein the controller records which of the plurality of first rods has the lowest electrical resistance and which of the plurality of second rods has the lowest electrical resistance.

11. A shocker comprising:
a first enclosure having a first exterior wall that is transparent;
a plurality of first rods extending across the first enclosure proximate a first bottom thereof; and
a controller electrically connected to each of the plurality of first rods such that the controller places an electric current of no more than about 1 microampere for no longer than about 20 milliseconds across each of the plurality of first rods and measures the electrical resistance of each of the plurality of first rod and compares the electrical resistance of each of the plurality of first rods and such that the controller delivers an electric shock to the respective one of the plurality of first rods that has the lowest electrical resistance.

12. The shocker as in claim 11 wherein the electric shock is about 1 milliamp.

13. The shocker as in claim 11 wherein the controller records which of the plurality of first rods has the lowest electrical resistance.

14. The shocker as in claim 11 further comprising:
a second enclosure adjoining the first enclosure and separated from the first enclosure by a transparent separator, the second enclosure having a second exterior wall that is transparent;
a plurality of second rods extending across the second enclosure proximate a second bottom thereof; and
wherein the controller is electrically connected to each of the plurality of second rods such that the controller places an electric current of no more than about 1 microampere for no longer than about 20 milliseconds across each of the plurality of second rods and measures the electrical resistance of each of the plurality of second rods and compares the electrical resistance of each of the plurality of second.

15. The shocker as in claim 14 wherein the electric shock is about 1 milliamp.

16. The shocker as in claim 14 wherein the controller records which of the plurality of first rods has the lowest electrical resistance and which of the plurality of second rods has the lowest electrical resistance.

\* \* \* \* \*